(No Model.)
R. M. HUNTER.
ELECTRIC RAILWAY.
No. 433,170. Patented July 29, 1890.
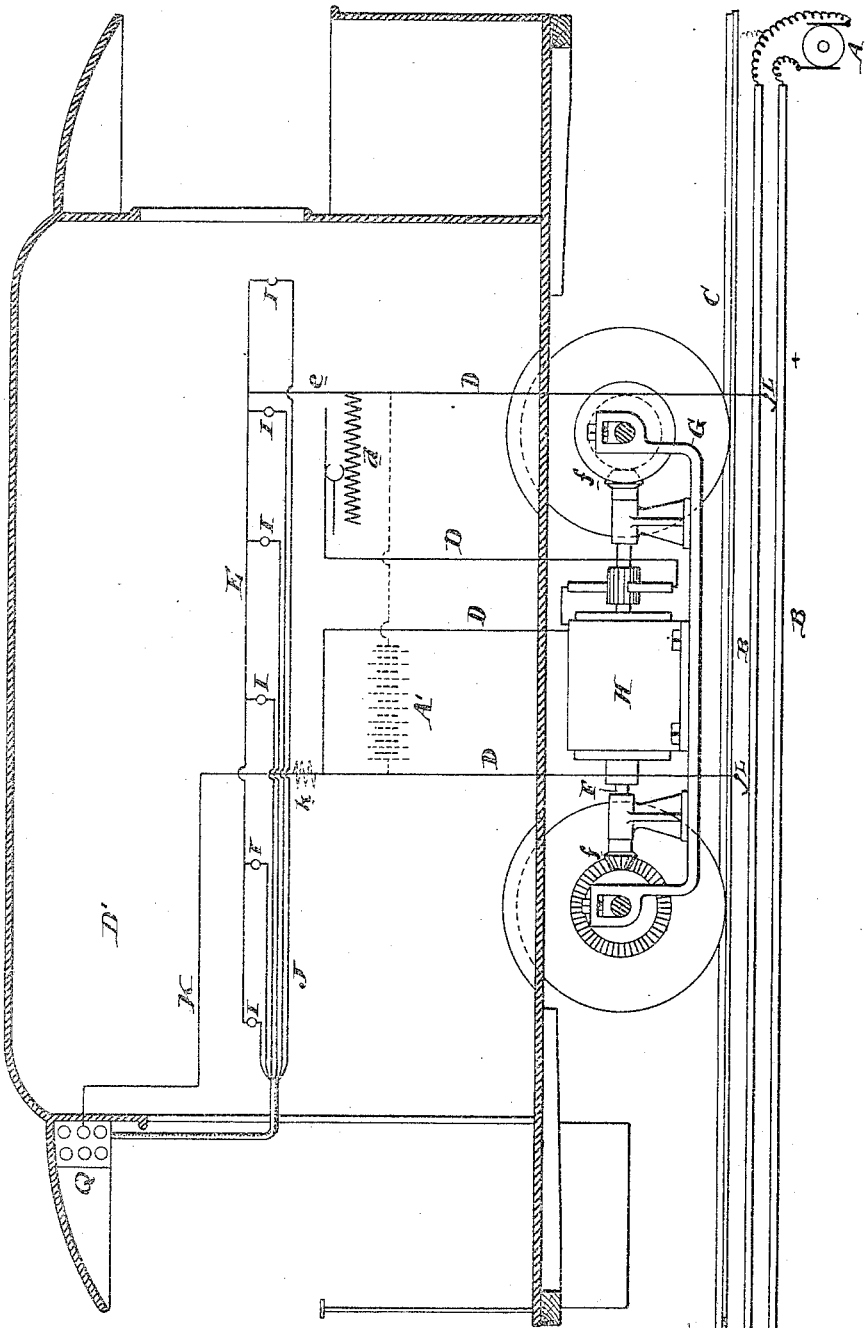
Witnesses:
Henry Faunt
Maurice H. Holmes.
Inventor:
R. M. Hunter

UNITED STATES PATENT OFFICE.

RUDOLPH M. HUNTER, OF PHILADELPHIA, PENNSYLVANIA, ASSIGNOR TO THE ELECTRIC CAR COMPANY OF AMERICA, OF SAME PLACE.

ELECTRIC RAILWAY.

SPECIFICATION forming part of Letters Patent No. 433,170, dated July 29, 1890.

Original application filed June 9, 1886. Serial No. 204,583. Divided and this application filed March 26, 1890. Serial No. 345,318.
(No model.)

*To all whom it may concern:*

Be it known that I, RUDOLPH M. HUNTER, of Philadelphia, in the county of Philadelphia and State of Pennsylvania, have invented an Improvement in Electric Railways, of which the following is a specification.

My invention has reference to electric railways; and it consists of certain improvements, all of which are fully set forth in the following specification, and shown in the accompanying drawing, which forms a part thereof.

This application (Case 131) is a division of my application, Serial No. 204,583, filed June 9, 1886.

The particular invention forming subject-matter of this division is a provision in an electrically-propelled vehicle of suitable signaling apparatus whereby any of the passengers in different parts of the car may signal the conductor when it is desired to stop the car, or when it is desired that the conductor go to the passenger for any purpose whatever, and in which said signaling aparatus is supplied from the same source of electric power which operates the electric motor used to propel the car. Broadly considered, it is immaterial what the source of power may be—that is to say, line-conductors extending along the railway may be employed, or batteries of any kind may be carried by the car. Preferably the signaling apparatus is arranged in multiple with respect to the motor when considering the source of power.

In the drawing is shown a sectional elevation illustrating an electrically-propelled vehicle embodying my invention.

A represents a source of power, such as a dynamo-electric machine.

B B are conductors extending along the railway, and, if desired, may be arranged above the car, or on the surface, or in a conduit, the particular location being immaterial.

C are the rails, and it is evident that they might be used as part of the conductors, if so desired.

D' is the electric car, and is propelled by an electric motor H, of any suitable construction, which is shown as arranged upon a frame G, carried upon the axles of the car and having its shaft F arranged longitudinally and gearing at $f$ with said axles.

D is the motor-circuit, and receives current from the conductors B through sliding connections or collectors L of any suitable construction.

$d$ is a current controller or regulator for controlling the speed of the motor.

Q is an indicator arranged in view of the conductor (man) on the platform and is operated by any of the push-buttons or switches I, arranged at different places within the car. Each one of the push-buttons I has its own indicator-tablet in the indicator Q, so that any passenger may signal the conductor and he will know who wishes him, or who it is that wishes to get out of the car.

E is a circuit, including one of the terminals of each of the push-buttons I, and is connected by a branch $e$ with the motor-circuit D on one side of the motor.

J are a series of circuits leading from the several push-buttons to the indicator Q.

K is a return-circuit from the indicator Q and connects with the motor-circuit D upon the other side of the motor to where the connection was made by the circuit $e$. If desired, a resistance $k$ may be located in the circuit K, or the circuit which includes the indicator. In place of the line-conductors, a battery A' of the primary or secondary type may be employed as the source of power and be connected with the motor-circuits. An electric bell or bells or other suitable device may be used.

It is immaterial to my invention what the particular details of construction are, as they may be greatly modified without in the least departing from the spirit of the invention.

In this application I do not claim the construction and arrangement of the motor on the car, as they form subject-matter of my application of which this is a division.

Having now described my invention, what I claim as new, and desire to secure by Letters Patent, is—

1. The combination, in an electrically-propelled vehicle, of a truck or car frame, an electric motor carried thereby, a source of electrical energy, a motor-circuit for supplying electricity to the motor, a derived circuit in multiple with said motor-circuit, one or more circuit-breakers or switches in said derived circuit, and a position-indicator in and operated by the current in said derived circuit to indicate which circuit-breaker or switch is operated.

2. The combination, in an electrically-propelled vehicle, of a truck or car frame, an electric motor carried thereby, a source of electrical energy, a motor-circuit, a derived circuit in multiple with said motor-circuit and provided with circuit-breakers or switches for the passengers within the car or vehicle, and an indicator upon the platform in the derived circuit and operated by the current therein to indicate which circuit-breaker or switch is operated.

3. In an electrically-propelled vehicle, the combination of an electric motor to propel the vehicle, a motor-circuit for supplying current to the motor and in connection with the source of electrical energy, an indicator upon the car in view or hearing of the conductor or operator, two or more circuit-breakers or switches within the car to be operated by the passengers, and a circuit including the indicator and circuit-breakers or switches in multiple with respect to the motor.

4. In an electrically-propelled vehicle, the combination of an electric motor to propel the vehicle, a motor-circuit for supplying the current to the motor in connection with the source of electrical energy, a motor-regulator in the motor-circuit for controlling the speed of the motor, an indicator arranged upon the car in view or hearing of the conductor or operator, two or more circuit-breakers or switches within the car, to be operated by the passengers, and a circuit including the indicator and circuit-breakers or switches in multiple with respect to the motor and the motor-regulator.

5. In an electrically-propelled vehicle, the combination of an indicator in view of the operator or conductor, a series of circuit-breakers or switches located at different portions of the interior of the car-body, to be operated by the passengers, a source of electrical energy, and circuits including the several circuit-breakers or switches and the indicator in connection with the source of electrical energy.

6. In an electrically-propelled vehicle, the combination of an indicator in view of the operator or conductor, a series of circuit-breakers or switches located at different portions of the interior of the car-body, adapted to be operated by the passengers, a source of electrical energy, circuits including the several circuit-breakers or switches and the indicator in connection with the source of electrical energy, and an electric motor to propel the car, also connected by suitable circuits to receive electrical energy from the same source of power as the indicator.

In testimony of which invention I have hereunto set my hand.

R. M. HUNTER.

Witnesses:
 EARNEST HOWARD HUNTER,
 S. T. YERKES.